US011296834B2

(12) United States Patent
Heer

(10) Patent No.: US 11,296,834 B2
(45) Date of Patent: Apr. 5, 2022

(54) REDUNDANT TRANSMISSION SYSTEM FOR PRP AND MULTIPLE DATA PACKETS

(71) Applicant: Hirschmann Automation and Control GmbH, Neckartenzlingen (DE)

(72) Inventor: Tobias Heer, Frickenhausen (DE)

(73) Assignee: HIRSCHMANN AUTOMATION AND CONTROL GMBH, Neckartenzlingen (DE)

( * ) Notice: Subject to any disclaimer, the term of this patent is extended or adjusted under 35 U.S.C. 154(b) by 403 days.

(21) Appl. No.: 15/302,191

(22) PCT Filed: Apr. 9, 2015

(86) PCT No.: PCT/EP2015/057784
§ 371 (c)(1),
(2) Date: Oct. 6, 2016

(87) PCT Pub. No.: WO2015/155314
PCT Pub. Date: Oct. 15, 2015

(65) Prior Publication Data
US 2018/0262298 A1  Sep. 13, 2018

(30) Foreign Application Priority Data

Apr. 9, 2014  (DE) .......................... 102014206873.8

(51) Int. Cl.
*H04L 1/22* (2006.01)
*H04L 1/00* (2006.01)
(Continued)

(52) U.S. Cl.
CPC ............... *H04L 1/22* (2013.01); *H04L 1/004* (2013.01); *H04L 1/0041* (2013.01); *H04L 1/08* (2013.01);
(Continued)

(58) Field of Classification Search
CPC ......... H04L 1/0041; H04L 45/28; H04L 1/22; H04L 1/08; H04L 1/004; H04L 2001/0096
(Continued)

(56) References Cited

U.S. PATENT DOCUMENTS

| 5,729,648 A * | 3/1998 | Boyce ................... G11B 5/0086 375/E7.013 |
| 5,933,567 A * | 8/1999 | Lane ................... G11B 15/1875 386/200 |
| 7,516,386 B2 * | 4/2009 | Herley ................... H04L 1/1812 714/746 |

(Continued)

FOREIGN PATENT DOCUMENTS

| DE | 19833292 A | 1/2000 |
| DE | 2011084344 A | 4/2013 |

(Continued)

*Primary Examiner* — Albert Decady
*Assistant Examiner* — Enam Ahmed
(74) *Attorney, Agent, or Firm* — Andrew Wilford

(57) ABSTRACT

A method of operating a transmission system (1) having a first network (2) and at least one second network (3) where data is exchanged in that data of the first network (2) is inputted between these at least two networks (2, 3) into duplication means (4), and the inputted data is transmitted wirelessly via at least two transmission paths (6, 7) using PRP to separator means (5) and forwarded from the separating means (5) to the connected second network (3), characterized in that the data is transmitted as data packets and each data packet is transmitted several times via the same transmission path (6, 7).

2 Claims, 1 Drawing Sheet

(51) Int. Cl.
*H04L 1/08* (2006.01)
*H04L 45/28* (2022.01)

(52) U.S. Cl.
CPC ...... *H04L 45/28* (2013.01); *H04L 2001/0096* (2013.01)

(58) Field of Classification Search
USPC .................................................. 714/746, 764
See application file for complete search history.

(56) References Cited

U.S. PATENT DOCUMENTS

| | | | | |
|---|---|---|---|---|
| 7,787,389 | B2* | 8/2010 | Chen ................. | H03M 13/2909 370/252 |
| 7,956,772 | B2* | 6/2011 | Shokrollahi ....... | H03M 13/1191 341/51 |
| 8,358,704 | B2* | 1/2013 | Shi ........................ | H04N 19/44 375/240.27 |
| 8,392,791 | B2* | 3/2013 | Saliba .................. | G06F 3/0641 714/758 |
| 8,443,261 | B2* | 5/2013 | Waldspurger ........... | G06F 11/08 714/764 |
| 2003/0053475 | A1* | 3/2003 | Veeraraghavan ......... | H04L 1/22 370/431 |
| 2006/0059407 | A1* | 3/2006 | Wang ...................... | H04L 12/18 714/764 |
| 2006/0165107 | A1* | 7/2006 | Legallais ................ | H04L 12/18 370/401 |
| 2007/0230496 | A1* | 10/2007 | Guo ........................ | H04L 1/007 370/432 |
| 2009/0028081 | A1* | 1/2009 | Song ...................... | H04L 45/74 370/310 |
| 2010/0085964 | A1 | 4/2010 | Weir | |
| 2011/0258507 | A1* | 10/2011 | Rideout ............ | H04L 29/06027 714/746 |
| 2012/0192031 | A1* | 7/2012 | Liu ......................... | H04L 1/007 714/752 |
| 2012/0226936 | A1* | 9/2012 | Prabhakaran ....... | G06F 11/1662 714/6.23 |
| 2013/0254614 | A1* | 9/2013 | Kumar ................ | H04L 63/0428 714/748 |
| 2014/0040693 | A1* | 2/2014 | Kim ........................ | H04W 4/06 714/746 |
| 2014/0071805 | A1* | 3/2014 | Billau ................... | H04W 28/04 370/216 |
| 2014/0092872 | A1* | 4/2014 | Rentschler ................ | H04L 1/22 370/331 |
| 2014/0369249 | A1* | 12/2014 | Mikhailov .............. | H04W 4/06 370/312 |
| 2015/0067431 | A1* | 3/2015 | Haug .................... | H04L 1/1819 714/746 |
| 2015/0249468 | A1* | 9/2015 | Nikkila ................. | G10L 19/005 714/746 |

FOREIGN PATENT DOCUMENTS

FI         128272 B    *   2/2020
KR    20170029212 A    *   3/2017

* cited by examiner

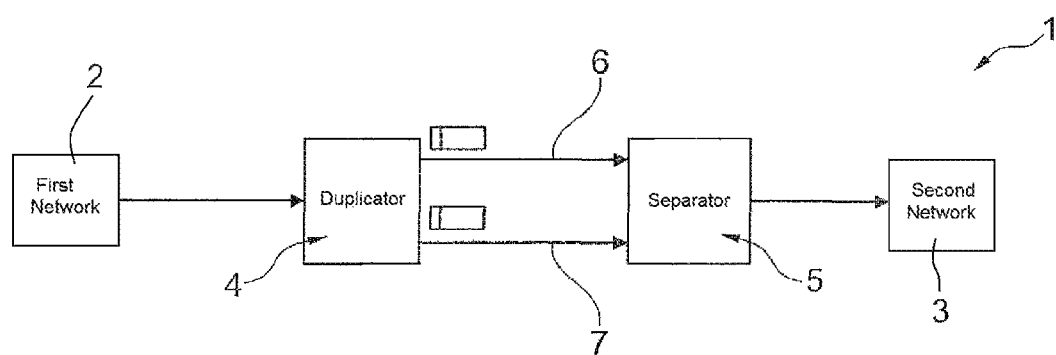

REDUNDANT TRANSMISSION SYSTEM FOR PRP AND MULTIPLE DATA PACKETS

CROSS REFERENCE TO RELATED APPLICATIONS

This application is the US-national stage of PCT application PCT/EP2015/057784 filed 9 Apr. 2015 and claiming the priority of German patent application 102014206873.8 itself filed 9 Apr. 2014.

The invention relates to a method of operating a transmission system having a first network and at least one second network, wherein between these at least two networks data is exchanged in such a way that data of the first network is inputted into duplication means, and the inputted data is transmitted wirelessly via at least two transmission paths using PRP to separator means and forwarded from the separating means to the connected second network according to the features of the preamble of the two independent claims.

Such known transmission systems are used in safety-critical cases in process plants, stationary or mobile work devices, for example in work vehicles such as cranes or the like.

It is important that data is reliably transmitted from the first network to the at least one second network. Such safety-critical data transmission is especially important when the data is transmitted via a wireless transmission path. To this end, there has already been an improvement such that not just one transmission path, but at least two, preferably precisely two transmission paths are used for this security application (also called safety application). A further improvement of this redundant data transmission has thus occurred in that it is used wirelessly, i.e. via radio or light, by the PRP (Parallel Redundancy Protocol), which is a Layer 2 redundancy method independent of higher layers and, above all, suitable for real-time Ethernet mechanisms.

From a security standpoint, such a transmission system already operates satisfactorily because the redundancy of the two transmission paths is ensured. For example, this can be the case if a wireless transmission path is disrupted or fails, the at least second transmission path is used to guarantee data transmission from the first to the second network.

However, it cannot be ruled out that the data transmission between the two networks may be disrupted in an impermissible manner in terms of safety-critical aspects despite this redundancy.

The invention is therefore based on the object of significantly improving a method of operating a transmission system under safety-critical aspects.

This object is solved by the features of the two independent claims.

On the one hand, the invention provides that the data is transmitted as data packets and each data packet is transmitted several times via the same transmission path. It is assumed that in the event that a single data packet is lost on this transmission link, at least its successor, i.e. the following data packet, is transmitted without errors. This transmission manner is supported by PRP. Advantageously, it can therefore be accepted that one data packet is always lost on a transmission path for whatever reason and the at least one more data packet sent after it is transmitted error-free. Here, there could be additional thought of a feedback mechanism that then prevents resending of data packets if a data packet has been recognized to be transmitted without errors.

In the development of the invention, each data packet is transmitted at least twice via the same transmission path. It is assumed here that the first data packet s ent to the transmission point is lost due to some disturbance and the second data packet, which was sent directly after it, arrives without error. Instead of this, it is of course conceivable that each data packet is transmitted more than twice via the same transmission path. Here, it may be considered that each data packet is transmitted three times, four times and repeatedly via the same transmission path.

In order to achieve a compromise with regard to the transmission time and the redundancy, it is intended in a particularly advantageous manner that each data packet is transmitted exactly three times via the same transmission path. It is therefore possible that two of the three sent identical data packets may be lost on the same transmission path due to a fault, so that the third data packet arrives. It is assumed that it is sufficient to transmit three identical data packets in a row via the same transmission path and thereby to accept the loss of two of the three data packets. This way, a sufficiently high redundancy is ensured with simultaneous rapid data transmission.

With respect to the above-described manner of transmitting data packets over the same transmission path, it is assumed here that the same data packet is transmitted at least twice in succession via the same transmission path. If the first data packet sent on the transmission path arrives without error, then the second data packet can be discarded. The same applies in the event that more than two identical data packets in succession have been sent to the transmission path. If the first or the first and at least one further data packet is lost, the following data packet is used in the second network.

The same procedure is carried out not only on the one transmission path, but also on the at least one another transmission path, preferably via the two transmission paths, so that only two such transmission paths are available. In such cases, consideration can be given to sending similar data packets in a row at the same time or at different times or to sending them in a different way to the at least two transmission paths, preferably exactly the two transmission paths.

On the other hand, the object of the invention is achieved in that the data is transmitted as data packets and each data packet is allocated an error correction value. This means that it is possible in an advantageous manner to add redundancy information in the form of an error correction value to the data packets in order to increase redundancy during the transmission of data via the two transmission paths. These error correction values can only be assigned to those data packets that are transmitted via one or the other transmission path. Alternatively, it is conceivable that the error correction values are assigned to the data packets that are transmitted via the at least two transmission paths. Alternatively or in addition thereto, it is of course also possible to assign different error correction values to the data packets being transmitted via the one transmission path than to the data packets being transmitted via the first transmission path.

In the development of the invention, a forward error correction procedure is carried out using the error correction values. Using the forward error correction (also known as FEC for Forward Error Correction), it is possible to reduce the error rate in the transmission of data, in particular digital data being transmitted as data packets, meaning an error correction procedure is available as a result. If such a forward error correction is used in a transmission system, the data packet being transmitted is encoded in a redundant manner by the transmitter (duplication means), meaning the recipient (separator means) can recognize and correct transmission errors without checking with the transmitter. In the case of data packets to be transmitted, the error correction values are added in the form of additional bits used after transmission via the one transmission path to recognize and rectify errors where appropriate.

In a particularly advantageous manner, the two presented solutions are combined with each other. As a result, the redundancy is considerably increased and safety-critical conditions that could result from an incorrect data transmission are significantly reduced due both to the repeated transmission of the data packets via the same transmission path and by using error correction values with safety-critical aspects.

The two presented methods, which can be operated individually or together, are therefore particularly advantageous in terms of the latency time (waiting time) during transmission, in terms of reliability and also in terms of the data throughput during the transmission of data between at least two networks of particular advantage.

One or both of the presented methods can be applied to a transmission system as shown in FIG. 1.

FIG. 1 shows a basic arrangement of a transmission system comprising two networks 2, 3 that are to exchange data. This data exchange may either be unidirectional from the network 2 to the network 3 (or vice versa), as well also bidirectional between the two networks 2, 3.

The networks 2 and 3 can be simple or complex networks, for example in a ring or line topology or the like. However, it is also conceivable that each network 2 or 3 comprises only one single element such as a sensor, an actuator, a controller or the like.

To transmit the data of the network 2, for example, to the network 3, a duplicator 4 are available. This duplicator 4 divides the supplied data stream into two data streams. In the same way, the merging of the two data streams is carried out according to their receipt via a separator 5 where the received data streams are forwarded to the network 3 after merging.

The transmission of data between the duplicator and the separator 5 occurs wirelessly via two identical or different transmission paths 6 and 7 using PRP. The wireless transmission takes place advantageously via radio, although optical transmission is also conceivable. It is also conceivable that the one transmission path 6 is a radio data path and the second transmission path 7 is an optical data path. If both transmission routes 6 are 7 are radio transmission links for example, the data, more specifically the data packets, can be transmitted via these two radio transmission paths for example at the same frequency or different frequencies and with otherwise identical parameters or differing transmission parameters. Identical transmission routes 6 and 7 are preferable due to their structure, and mutually different transmission paths 6, 7 (for example optical/radio or mutually different transmission parameters) are preferable in terms of increasing redundancy.

After the data has been supplied from the first network 2 to the duplicator 4 (in PRP also known as a Redundancy Box), it then triggers each data packet to be transmitted several times via the same transmission path 6, 7 and/or an error correction value is allocated to each data packet. Subsequently, in a corresponding manner, the transmission of data packets via the transmission paths 6 and 7 occurs, and this is evaluated accordingly by the separator 5 (in the case of PRP, also known as Redundancy Box), prepared as applicable and supplied as data packets to the second network 3.

The above description of FIG. 1 relates to a unidirectional data transmission from the first network 2 to the other, specifically the second network 3. For this purpose, the duplicator 4 is designed to split the data stream and the separator 5 is designed to merge the received data stream.

If data transmission from the network 3 to the network 2 is also desired, a further duplicator 4 or separator 5 may be present in the transmission path between the network 3 and the network 2, implying a double structure. Alternatively, the duplicator 4 and separator 5 can also be designed to both duplicate the supplied data stream and separate the data streams supplied via the transmission paths 6 and 7, which also applies to the separator 5.

| List of reference numbers | |
|---|---|
| 1 | Transmission system |
| 2 | First network |
| 3 | Second network |
| 4 | Duplication means |
| 5 | Separator means |
| 6 | First transmission path |
| 7 | Second transmission path |

The invention claimed is:

1. A method of operating a transmission system having a first network and at least one second network, wherein data packets are exchanged between these at least two networks by the steps of:
   inputting data of the first network into duplication means and duplicating the data in the duplication means to form two identical data packets;
   allocating to each of the data packets a respective error correction value by adding bits to each of the data packets;
   transmitting each of the two identical data packets with the respective error correction value bits from the duplication means wirelessly twice according to a Layer 2 PRP protocol in a respective one of two separate data streams on respective transmission paths using PRP to separator means, whereby each data packet is transmitted twice over two separate data streams;
   forwarding the data streams from the separator means to the connected second network; and
   carrying out forward correction using the error correction values.

2. The method defined in claim 1, further comprising the step of, on recognition that a data packet has been received without errors,
   preventing the first network from resending the data packet that was received without errors.

\* \* \* \* \*